No. 821,120. PATENTED MAY 22, 1906.
W. A. PHILLIPS.
THROTTLE VALVE.
APPLICATION FILED AUG. 9, 1905.

Witnesses
M. A. Schmidt
Geo. E. Few

Inventor
William A. Phillips,
by Milo B. Stevens & Co.
Attorneys.

UNITED STATES PATENT OFFICE.

WILLIAM A. PHILLIPS, OF EAST CLEVELAND, OHIO.

THROTTLE-VALVE.

No. 821,120.  Specification of Letters Patent.  Patented May 22, 1906.

Application filed August 9, 1905. Serial No. 273,369.

*To all whom it may concern:*

Be it known that I, WILLIAM A. PHILLIPS, a citizen of the United States, residing at East Cleveland, in the county of Cuyahoga and State of Ohio, have invented new and useful Improvements in Throttle-Valves, of which the following is a specification.

This invention is a throttle-valve particularly adapted and intended for pneumatic hammers.

The object of the invention is to provide means for packing the valve and to remedy leakage caused by wear.

These valves have heretofore been usually made of one piece of steel, which is apt to wear the tube in which the valve moves and so cause leakage, with the expense and delay incident to putting in a new tube and perhaps a new valve. With my improvement the workmen will be able to make the necessary repairs in a few minutes simply by taking out the valve and removing the packing-rings and replacing them by new ones. With my valve the wear is not on the tube, but is on brass or other soft-metal packing-rings, which can be quickly replaced at a trifling expense.

Figure 1:
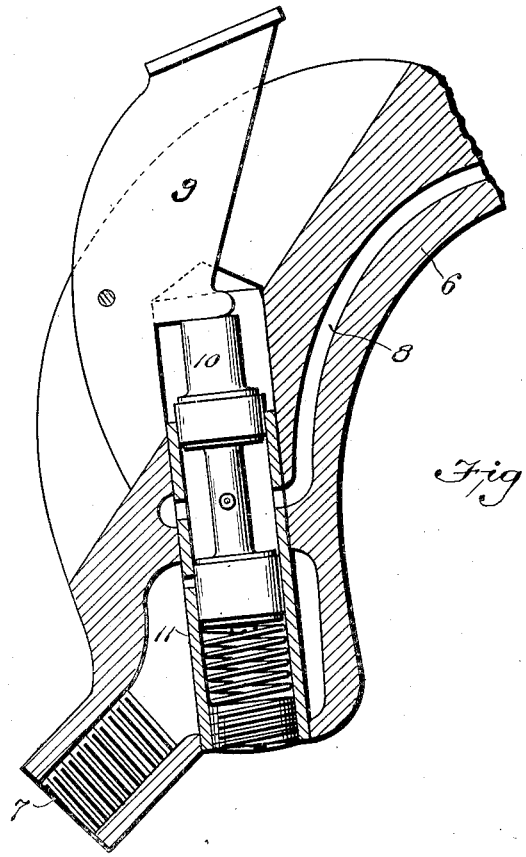
Figure 2:
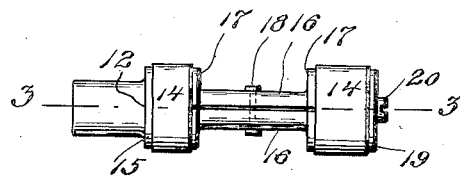
Figure 3:
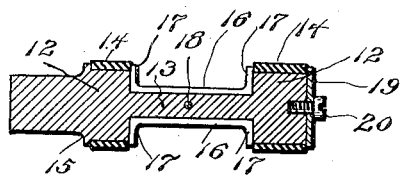

In the accompanying drawings, wherein the invention is illustrated, Figure 1 is a sectional view illustrating the valve in the tube of a pneumatic hammer. Fig. 2 is a plan view of the valve removed. Fig. 3 is a longitudinal section thereof on the line 3 3 of Fig. 2.

Referring specifically to the drawings, 6 indicates the handle of a pneumatic hammer, and 7 the inlet for the motive fluid, communicating by passage 8 with the barrel of the hammer.

9 is a thumb-lever which controls the valve, which is indicated as a whole at 10. This valve slides in a tube 11, located in a suitable recess in the handle and having ports which are controlled by the movement of the valve in a known manner.

The valve has the form of a piston with two heads 12, connected by a rod 13.

14 indicates packing-rings made of brass or other metal. These are cylindrical in form and are not split, but fit over the heads at a snug fit. The upper or forward ring abuts against a flange 15 on the head 12. On the piston-rod between the two heads is a split sleeve the parts of which are shown at 16, having at the ends flanges 17, which lap or project out against the ends of the rings 14, and so hold the rings in place on the heads. The split sleeve is held on the rod by a pin 18, which can be taken out to remove the parts of the sleeve. The ring 14 on the lower or rear head is held on by a washer 19, secured by a screw 20 at the end of the piston. The bearing-rings 14 fit in the tube and take the wear incident to the motion of the valve. When the rings become worn, they can be removed and renewed by taking off the washer 19 and the sleeve 16. This allows the rings to be slipped off of the rear end of the piston, and new rings can then be put on, after which the sleeve and washer are replaced. This can be done in a very short time and at very small expense. For the reasons heretofore stated this valve will be found superior to the solid steel valve in common use.

What I claim as new, and desire to secure by Letters Patent, is—

1. A piston-valve having a rod and heads integral therewith, packing-rings on the heads, and a split sleeve on the rod between the heads, holding the rings thereon.

2. A piston-valve having a rod and heads integral therewith, packing-rings on the heads, a split sleeve on the rod between the heads, and a washer on the end of the valve, the rings being held in place by the sleeve and the washer.

In testimony whereof I have signed my name to this specification in the presence of two subscribing witnesses.

WILLIAM A. PHILLIPS.

Witnesses:
JOHN A. BOMMHARDT,
SHIRLEY BOMMHARDT.